(12) United States Patent
Hirsch

(10) Patent No.: US 7,881,694 B2
(45) Date of Patent: Feb. 1, 2011

(54) CYCLED RECEIVER FOR MOBILE WIRELESS DEVICES

(75) Inventor: Olaf Hirsch, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 263 days.

(21) Appl. No.: 11/574,242

(22) PCT Filed: Aug. 31, 2005

(86) PCT No.: PCT/IB2005/052862

§ 371 (c)(1),
(2), (4) Date: Mar. 9, 2009

(87) PCT Pub. No.: WO2006/025031

PCT Pub. Date: Mar. 9, 2006

(65) Prior Publication Data

US 2009/0207767 A1  Aug. 20, 2009

Related U.S. Application Data

(60) Provisional application No. 60/606,313, filed on Aug. 31, 2004.

(51) Int. Cl.
*H04B 1/16* (2006.01)
*H04M 1/00* (2006.01)

(52) U.S. Cl. ............ 455/343.2; 455/343.3; 455/343.4; 455/552.1

(58) Field of Classification Search .......... 370/328, 370/338; 455/41.2, 552.1, 553.1, 574, 343.2, 455/343.4, 343.5, 344
See application file for complete search history.

(56) References Cited

U.S. PATENT DOCUMENTS

| | | | | |
|---|---|---|---|---|
| 6,366,768 | B1* | 4/2002 | Tessier et al. | 455/260 |
| 6,587,450 | B1* | 7/2003 | Pasanen | 370/338 |
| 6,633,753 | B1* | 10/2003 | Kido | 455/343.2 |
| 6,895,220 | B2* | 5/2005 | Usui | 455/41.2 |
| 2004/0153676 | A1* | 8/2004 | Krantz et al. | 713/300 |

* cited by examiner

*Primary Examiner*—Un C Cho

(57) ABSTRACT

A wireless device (110) is provided for supporting extended battery life. A transceiver (132) is configured to receive and transmit data over a wireless link. A frame detection sensor (140) is coupled to the transceiver and configured to sense an incoming frame and generate an incoming frame sensor signal. A controller (142) is coupled to the frame detection sensor and transceiver, and configured to selectively deactivate a portion of the transceiver device based at least in part on the frame sensor signal. Advantages of the invention include the ability to extend battery life in mobile wireless devices.

18 Claims, 4 Drawing Sheets

CYCLED RECEIVER FOR MOBILE WIRELESS DEVICES

CROSS REFERENCE TO RELATED APPLICATION

This application claims the benefit of U.S. provisional application Ser. No. 60/606,313 filed Aug. 31, 2004, which is incorporated herein whole by reference.

The present invention relates to the general field of wireless local area network (WLAN) and more particularly to improving battery life in mobile devices.

Wireless Local Area Networks (WLAN) are evolving and communication speed is increasing. However, a mobile wireless device uses a significant percentage of power to operate the transceiver portion of the device. Consequently, battery life can be reduced when the mobile device is actively using WLAN communication.

One of the most popular wireless protocols is 802.11, which represents an IEEE standard. There are various types of 802.11 protocols, for example, 802.11a, 802.11b and so on. The IEEE 802.11b WLAN standard provides a protocol standard that includes a receiver configured to detect a WLAN frame. The receiver continuously runs a detection algorithm on any received signal looking for a synchronization portion of a frame, which requires that the complete receiver chain (LNA, LO, Filters, etc.) is active at all times. In other words, conventional implementations require that the complete receiver chain be active at all times because the arrival time of a frame is not known. This always-on configuration represents a significant power consumption of the mobile wireless device.

As these exemplary protocols evolve, there is a desire to include interoperability with older protocols by including legacy compatibility in newer mobile wireless devices. Since some legacy protocols require more synchronization time, there may be techniques for improving battery life by taking advantage of the ability for newer mobile wireless devices to quickly synchronize on new protocols when communicating with legacy networks using older protocols.

What is needed is a technique for extending battery life in wireless devices while providing communication with both newer protocols and legacy protocols. The invention described herein provides such a technique for extending the battery life of the wireless devices.

The invention supports wireless local area network (WLAN) devices with extended battery life. The invention briefly switches the power off and on to portions of the wireless device, for example, the radio front end and other components of the receiver chain. The off time is just short enough to make sure that the functionality is not compromised. The on period is just long enough to detect a frame. These off times can reduce the power consumption of the wireless device significantly. Applications of the invention are mobile and battery powered WLAN systems or other WLAN systems with low power receiver requirements.

In an exemplary embodiment, a wireless device is provided for supporting extended battery life. A transceiver is configured to receive and transmit data over a wireless link. A frame detection sensor is coupled to the transceiver and configured to sense an incoming frame and generate an incoming frame sensor signal. A controller is coupled to the frame detection sensor and transceiver, and configured to selectively deactivate a portion of the transceiver device based at least in part on the frame sensor signal.

In one aspect of the invention, certain parts of the radio frequency (RF) receiver such as the low noise amplifier (LNA), local oscillator (LO), filter and other components that have a fast switch on and switch off time are switched on and off in short intervals. The intervals are just short enough to make sure that the receiver can still detect a WLAN frame. The on period is just long enough to detect whether a frame is 'in the air'. The on and off times can be controlled by the digital chip (baseband chip) or by the RF chip (receiver front end).

Advantages of the invention include the ability to extend battery life in mobile wireless devices.

The invention is described with reference to the following figures.

Figure 3A:
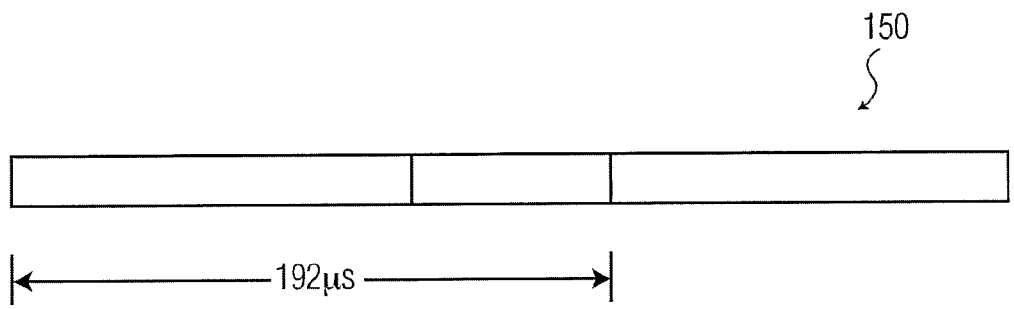
Figure 3B:
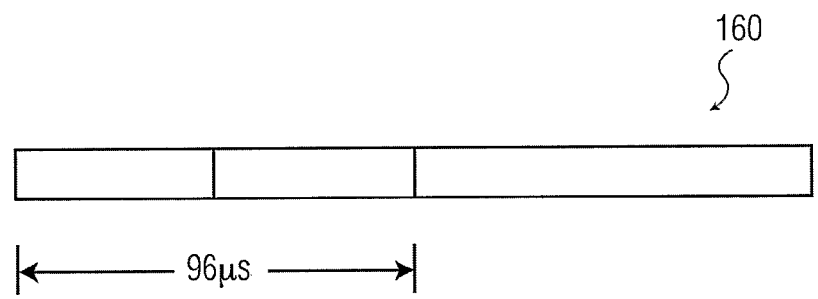
Figure 3C:
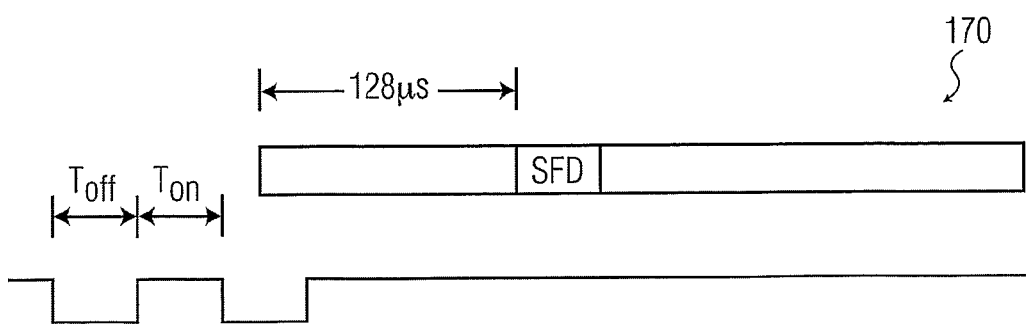
Figure 4:
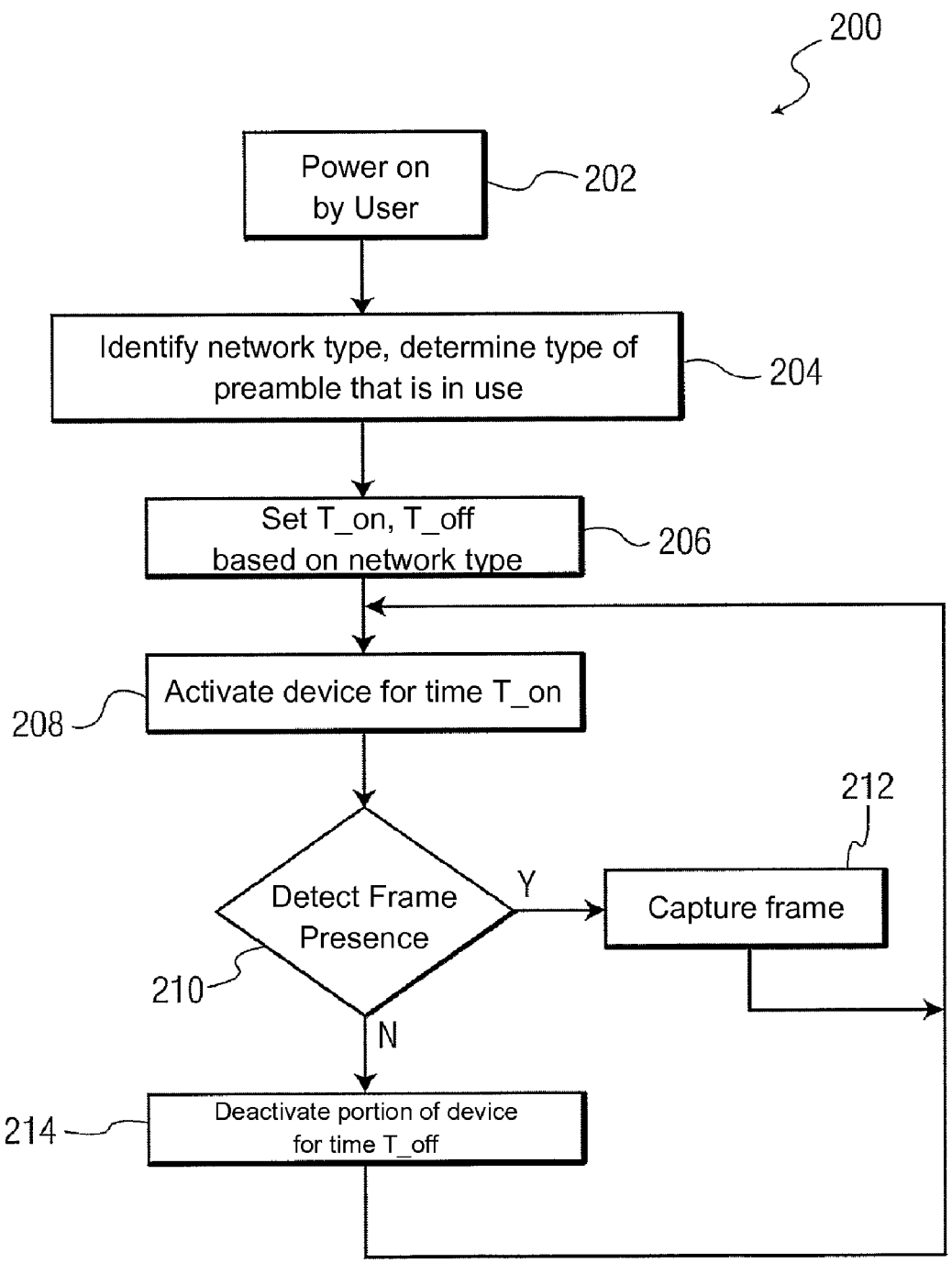

FIGS. 3A-C depict exemplary wireless protocol frames according to embodiments of the invention; and FIG. 4 is a flow diagram showing a method for extending the battery life of wireless devices operating in a wireless local area network (WLAN) according to an embodiment of the present invention.

The invention is described with reference to specific apparatus and embodiments. Those skilled in the art will recognize that the description is for illustration and to provide the best mode of practicing the invention. While references are made to specific wireless devices and protocols, the invention is applicable to many different types of devices and protocols. For example, while the wireless protocol 802.11 is used herein, the invention is applicable to other protocols and communication techniques such as cellular communication, as well as analog and digital variations. Also, while the Internet is used as an exemplary communications network, other types of networks can be used with the invention.

Figure 1:
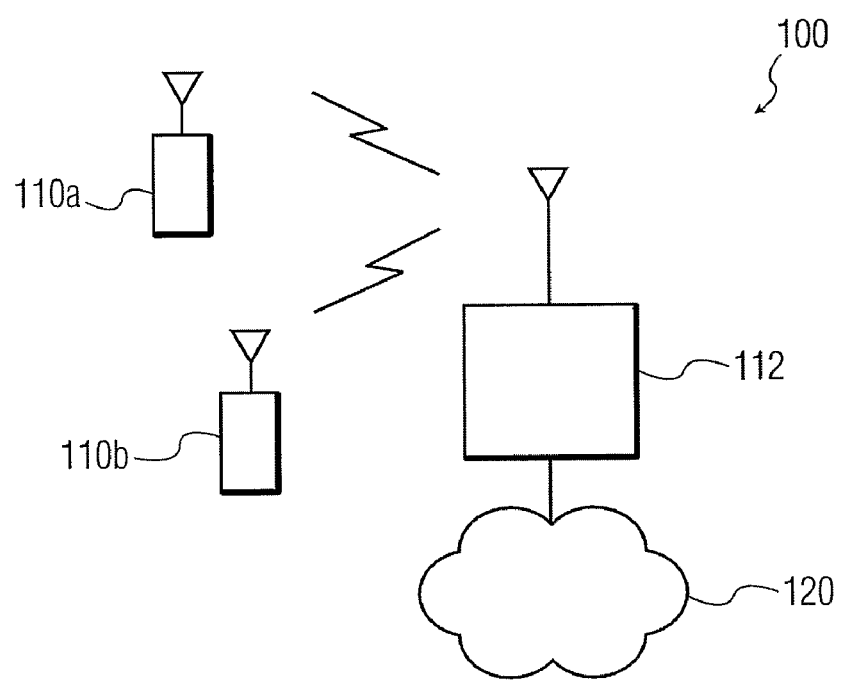
FIG. 1 depicts an exemplary wireless network showing a number of wireless devices communicating with one another over the network and with an access point.

FIG. 1 depicts an exemplary wireless local area network 100 (WLAN) showing a number of wireless devices 110a-110e communicating with one another over the network. These devices have the ability to communicate with one another using a wireless protocol such as IEEE standard 802.11. The devices 110a-110e are, for example, telephones, personal digital assistants (PDAs), laptop computers or other electronic devices. Moreover, some of these devices may be on battery power while others may be powered by an available power outlet.

A WLAN access point 112 is provided for the devices to connect with the Internet 120. While one access point is shown in FIG. 1, there may be many access points and each may be connected directly to the Internet or through other routers or switches to one another and/or the Internet.

Figure 2:
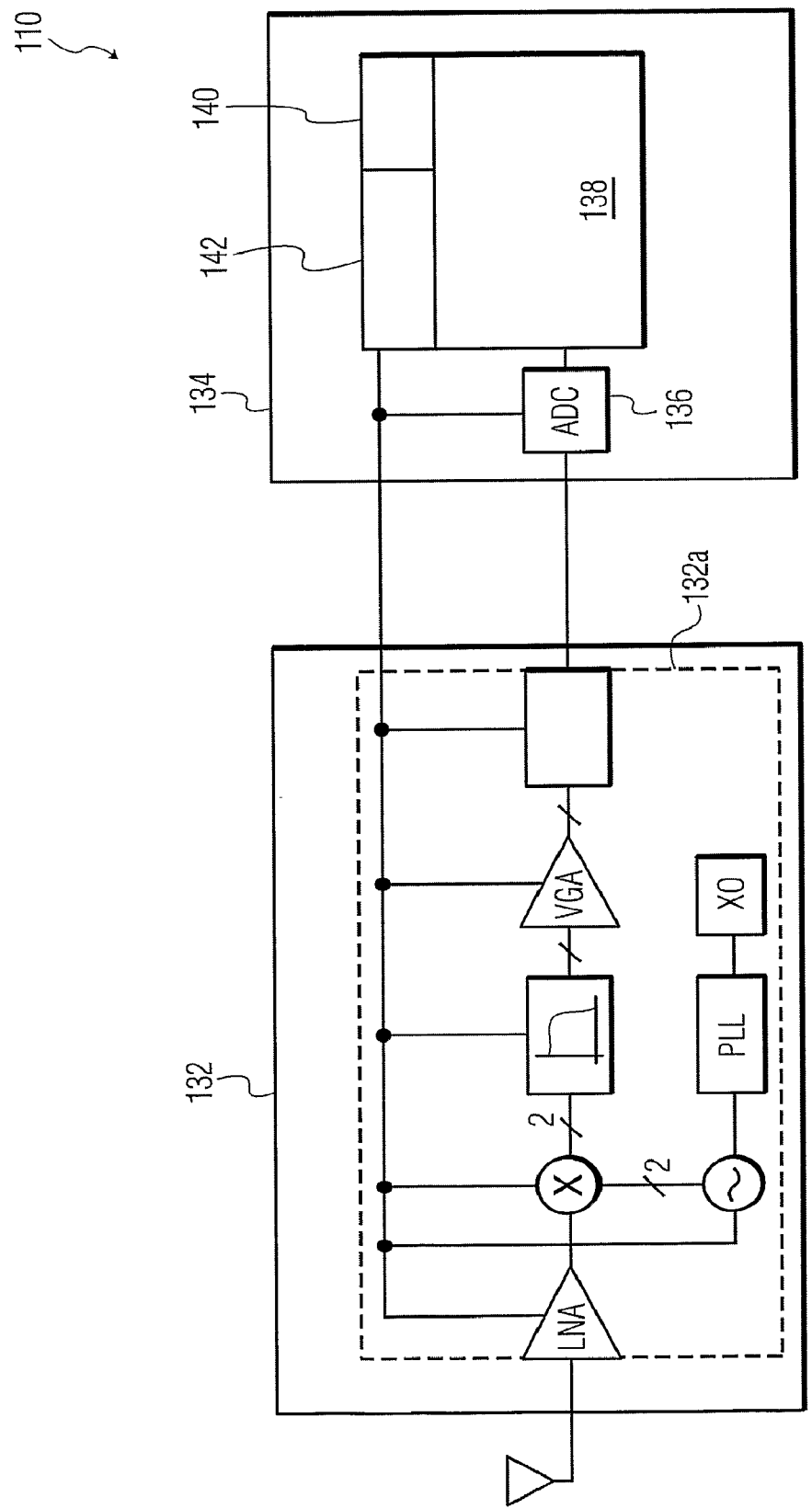
FIG. 2 depicts an exemplary wireless device according to an embodiment of the invention.

FIG. 2 depicts an exemplary wireless device 110 according to an embodiment of the invention. The wireless device 100 includes a radio front end 132 and baseband 134 portions. The front end 132 includes a number of receiver circuits identified as 132a. These include, for example, low noise amplifier (LNA), local oscillator (LO), Filter and potential components which have a fast switch on and switch off time. The baseband 134 includes an analog to digital converter (ADC) 136 and digital control and processing circuits 138. The device 110 detects a WLAN frame by detecting the energy of an incoming frame or by detecting the synchronization signal at the beginning of a frame or by a combination of both. In one aspect of the invention, the energy is detected in the ADC by the increased incoming analog signal as explained below. In order to reliably detect a frame only part of the synchronization signal is needed. This technique is explained with reference to FIGS. 3A-C.

FIGS. 3A-C depict exemplary wireless protocol frames according to embodiments of the invention. Frame 3A depicts a long frame format 150 according to the IEEE 802.11 standard. In this format, the preamble and header are 192 μs long. Frame 3B depicts a short frame format 160 according to the IEEE 802.1b standard. In this format, the preamble and header are 96 μs long. A transmitter using the short frame will only interoperate with another receiver that is also capable of receiving the short frame. Consequently, to interoperate with a receiver that is not capable of receiving a short preamble and header, the transmitter must use the long preamble and header. Newer equipment is capable of using the short frame format, but older legacy equipment is not.

FIG. 3C depicts frame 170 that uses an exemplary synchronization that is 128 μs. The difference between this length of time and the short preamble/header can be used to save power in the receive path by switching the receive path on and off (T_on and T_off). Each part is just long enough so that an incoming frame can still be reliably detected. The remaining portion of the time could be called, for example, T_not_needed since the invention can still reliably detect a frame without the need to be turned on full-time. T_not_needed is the time duration that the detection algorithm does not require from the preamble to detect a frame. The on (T_on) and off (T_off) times are controlled by the baseband portion of the radio 134. Once the baseband detects the presence of a frame it keeps the receive path switched-on and synchronizes to an incoming frame and continues to receive and decode the rest of the frame.

According to an embodiment of the invention, a frame detection sensor 140 is coupled to the transceiver and configured to sense an incoming frame and generate an incoming frame sensor signal. In this case, that sensor is incorporated into the digital control and signal processing block 138. The digital control and signal processing block 138 acts as a controller to selectively deactivate a portion of the transceiver based at least in part on the frame sensor signal.

In one aspect, the transceiver includes a receiver portion 132a and a transmitter portion and the controller is configured to selectively deactivate the receiver 132a based at least in part on the frame sensor signal. In one aspect, the controller is configured to selectively deactivate the transceiver for a predetermined period of time based at least in part on the frame sensor signal. In one aspect, the predetermined period of time is less than an expected frame.

The system detects a WLAN frame by detecting the energy of an incoming frame or by detecting the synchronization signal at the beginning of a frame or by a combination of both. In order to reliably detect a frame only part of the synchronization signal is needed. The frame detection sensor generates a frame sensor signal.

The frame sensor signal can be used to save power in the receive path by switching the receive path on and off. Each part is just long enough so that an incoming frame can still be reliably detected. The on and off times are controlled by the baseband portion 134 of the receiver. Once the baseband detects the presence of a frame it keeps the receive path switched-on and synchronizes to an incoming frame and continues to receive and decode the rest of the frame.

The on time depends on the time it takes the WLAN system to detect the presence of an incoming frame. In case of 802.11b this time is between 3 us and 4 us. The off time is determined by the time it takes to switch on the receiver and how much of the synchronization signal is needed to synchronize to the frame, run the automatic gain control (AGC), frequency offset estimation and train the equalizer.

The switch on time of the digital part of the receiver is almost instantaneous. The switch on time for the analog part of the receiver depends on the block inside of the receiver. The low noise amplifier (LNA), mixer, voltage controlled oscillator (VCO), filter VGA and buffer have typical switch on times of 2 us to 3 us. The oscillator (XO) and phase-locked loop (PLL) have longer switch on times in the order of hundreds of micro seconds.

How much of the synchronization sequence is needed to successfully receive a frame depends on several factors. The first factor is the type of preamble. Possible preambles are long SYNC, short SYNC and OFDM (orthogonal frequency-division multiplexing) training symbols depending on whether 802.11b or a/g is used. The second factor depends is whether the system uses receive diversity or not and the third factor depends on the speed of the following algorithms and how much of the synchronization signal they need to decode the rest of the frame with the targeted frame error rate.

In case of a long SYNC preamble the first 72 μs is not needed in the exemplary implementation since the same algorithm is used for long and short SYNC. Most, if not all, of the short SYNC is needed if receive diversity is used. If receive diversity is not used, the first 11 μs of the short SYNC signal do not have to be used. In case of OFDM training symbols most, if not all, of the symbols are needed if receive diversity is used. If receive diversity is not used the first 4 μs of the OFDM training symbols are not required.

An exemplary calculation is provided below for calculating the T_on and T_off times. T_not_needed is the time duration that the detection algorithm does not require from the preamble to detect a frame. T_rf_switchon is the time needed for the radio front end to be turned on in a ready state. T_detect is the time needed for the device to detect the presence of an incoming frame.

The max off time is calculated as follows.
T_off<=T_not_needed−T_rf_switchon−T_detect
T_detect_b=3 us (detection time for 802.11b frame)
T_off_long_sync<=72−2−3=67 μs
The duty cycle in this example is 7.5%

If the WLAN radio is taken as an example the overall current in receive mode is about 90 mA. About 58 mA can be saved during T_off.

The power consumption in the new mode would be reduced from 90 mA to (90-58) mA+7.5% * 58 mA=32 mA+4.3 mA=36.3 mA. This example translates into a power savings of about 60%.

In case of a short preamble and no diversity, the power savings would be smaller but still significant. The improvement for OFDM frames may depend on the exact number to switch on the RF, detect a signal and the time needed to synchronize to the training symbols.

FIG. 4 is a flow diagram 200 showing a method for extending the battery life of mobile wireless devices operating in a wireless local area network (WLAN) according to an embodiment of the invention. In step 202, the device is powered on by the user. Step 204 identifies the network type and determines the type of preamble is in use. Step 206 sets T_on and T_off based on the network type. Step 208 activates the device for time T_on and step 210 detects the presence of a frame. Presuming that a frame is detected, step 212 captures the frame and returns the process to step 208. If step 210 does not detect a frame, step 214 deactivates a portion of the device for a predetermined time T_off.

Presuming short preamble is not in use, step 208 determines that the long preamble is in use and step 210 determines if there is activity. If so, step 212 captures the frame and continues to provide power to active portions of the device. If there's no WLAN activity, then step 214 deactivates a portion of the wireless device for a time T_off. In this aspect of the invention, the device is deactivated for a predetermined time. As explained above, other deactivation aspects are also anticipated.

Advantages of the invention include the ability to prolong battery life in mobile wireless devices.

Having disclosed exemplary embodiments and the best mode, modifications and variations may be made to the disclosed embodiments while remaining within the subject and spirit of the invention as defined by the following claims.

What is claimed is:

1. A wireless device supporting extended battery life, comprising:
   a transceiver configured to receive and transmit data over a wireless link;
   a frame detection sensor coupled to the transceiver and configured to sense an incoming frame and generate an incoming frame sensor signal; and
   a controller coupled to the frame detection sensor and transceiver, and configured to selectively deactivate a portion of the transceiver after the generated incoming frame sensor signal indicates that the transceiver has sensed the incoming frame, wherein T on and T off times for the portion of the transceiver are set based upon a determined type of the wireless network.

2. The wireless device of claim 1, wherein the transceiver includes a receiver portion and a transmitter portion and the controller is configured to selectively deactivate the receiver portion.

3. The wireless device of claim 2, wherein the controller is configured to selectively deactivate the receiver portion for a predetermined period of time.

4. The wireless device of claim 3, wherein the predetermined period of time corresponds to at least a portion of a synchronization signal needed to detect the incoming frame.

5. The wireless device of claim 1, wherein the controller is configured to selectively deactivate the transceiver for a predetermined period of time.

6. The wireless device of claim 5, wherein the predetermined period of time corresponds to at least a portion of a synchronization signal needed to detect the incoming frame.

7. A method for extending battery life in a wireless device having a transceiver for use in a wireless network, comprising:
   receiving and transmitting data over a wireless link;
   detecting an incoming frame;
   generating an incoming frame sensor signal; and
   selectively deactivating a portion of the transceiver after the generated signal indicates that the transceiver has sensed the incoming frame;
   determining a type of the wireless network; and
   setting T on and T off times for the portion of the transceiver based upon the determined type of the wireless network.

8. The method of claim 7, wherein the transceiver includes a receiver portion and a transmitter portion, and wherein the selectively deactivating step further comprises:
   deactivating the receiver portion.

9. The method of claim 8, wherein the selectively deactivating step further comprises:
   selectively deactivating the receiver portion for a predetermined period of time.

10. The method of claim 9, wherein the predetermined period of time corresponds to at least a portion of a synchronization signal needed to detect the incoming frame.

11. The method of claim 7, wherein the selectively deactivating step further comprises:
   selectively deactivating the transceiver for a predetermined period of time.

12. The method of claim 11, wherein the predetermined period of time corresponds to at least a portion of a synchronization signal needed to detect the incoming frame.

13. The method of claim 7, further comprising:
   determining a type of preamble.

14. The method of claim 13, further comprising:
   determining whether the type of preamble is long SYNC, short SYNC, or Orthogonal Frequency Division Multiplexing (OFDM).

15. The method of claim 7, further comprising:
   using a baseband portion of the transceiver to control the T_on and T_off times.

16. The method of claim 7, wherein the step of detecting an incoming frame further comprises:
   detecting at least one of an energy of the incoming frame and a synchronization signal at a beginning of the incoming frame.

17. The method of claim 7, further comprising:
   determining the T_on time based upon a combination of factors.

18. The method of claim 17, wherein the combination of factors comprises at least two of:
   a period needed to switch on the transceiver,
   a portion needed to synchronize to the incoming frame,
   a period needed for automatic gain control (AGC),
   a period needed for frequency offset estimation, and
   a period needed to train an equalizer.

* * * * *